United States Patent [19]

Kurosawa et al.

[11] Patent Number: 5,322,919
[45] Date of Patent: Jun. 21, 1994

[54] PROCESS FOR PRODUCING A POLYCARBONATE IN INERT SOLVENT

[75] Inventors: Kouichi Kurosawa; Shigeki Kuze; Noriyuki Kunishi; Masaya Okamoto, all of Ichihara, Japan

[73] Assignee: Idemitsu Petrochemical Co., Ltd., Tokyo, Japan

[21] Appl. No.: 796,055

[22] Filed: Nov. 20, 1991

[30] Foreign Application Priority Data

Nov. 29, 1990 [JP] Japan ................... 2-325293

[51] Int. Cl.$^5$ .................................. C08G 64/20
[52] U.S. Cl. ............................ 528/198; 528/171; 528/174; 528/196; 528/202; 528/370; 528/371
[58] Field of Search .......... 528/198, 196, 202, 371, 528/370, 171, 174

[56] References Cited

U.S. PATENT DOCUMENTS 4,459,384  7/1984  Matzner et al. ................... 524/876

FOREIGN PATENT DOCUMENTS

| 0079075 | 5/1983 | European Pat. Off. |
| 2439552 | 2/1976 | Fed. Rep. of Germany |
| 153923 | 6/1990 | Japan |
| 153924 | 6/1990 | Japan |
| 153925 | 6/1990 | Japan |
| 153926 | 6/1990 | Japan |
| 153927 | 6/1990 | Japan |
| 175723 | 7/1990 | Japan |

OTHER PUBLICATIONS

H. Schnell, "Chemistry and Physics of Polycarbonates", 1964, Interscience Publishers, John Wiley & Sons, New York, London, Sydney, pp. 48-49, par. 1; FIG. III-3, p. 101, par. 6.

Chemisches Zentralblatt, vol. 136, No. 37, Sep. 8, 1965, Akademie-Verlag GmbH, Berlin, Verlag Chemie GmbH, Weinheim; No. 2920, p. 11755, "Herstellung von Polycarbonaten" of JP A.S. 11534/1962.

"Polycarbonate Resin", Nikkan Kogyo Shinbunsha, 1969, pp. 62-67 and English language translation.

Chemistry and Physics of Polycarbonates, H. Schnell, John Wiley & Sons, 1964, pp. 44-51.

*Primary Examiner*—John Kight, III
*Assistant Examiner*—Shelley A. Dodson
*Attorney, Agent, or Firm*—Frishauf, Holtz, Goodman & Woodward

[57] ABSTRACT

A process for producing polycarbonates which comprises transesterifying by reacting (A) at least one compound selected from the group consisting of aromatic dihydroxy compounds, aliphatic dihydroxy compounds, bisesters of aromatic dihydroxy compounds, bisesters of aliphatic dihydroxy compounds, carbonates of aromatic dihydroxy compounds and carbonates of aliphatic dihydroxy compounds, with (B) at least one compound selected from the group of diaryl carbonates, dialkyl carbonates, and alkylaryl carbonates, at a transesterification temperature of 100° C. to 330° C. in the presence of an inert solvent in an amount of 1 to 60% by weight based on the total of the theoretical amount of polycarbonate produced from the said compounds (A) and (B) and the amount of the inert solvent. According to the present invention, a polycarbonate which is excellent in color tone (transparency), heat resistance, and water resistance can be efficiently and simply produced at a low cost.

19 Claims, No Drawings

PROCESS FOR PRODUCING A POLYCARBONATE IN INERT SOLVENT

BACKGROUND OF THE INVENTION

Field of the Invention

The present invention relates to a process for producing a polycarbonate. More particularly, it relates to a process for efficiently producing a polycarbonate which is excellent in color tone, heat resistance and water resistance.

Description of the Related Arts

Generally, as the process for producing polycarbonate (hereinafter referred to as PC), the interfacial polycondensation method and the transesterification method are often employed. Each of these methods has its advantages, but, on the contrary, has various disadvantages.

For example, the interfacial polycondensation method can produce a high quality PC, but requires a large equipment in processing, which comes to cost much.

In the transesterification method, since distilling phenol and diphenylcarbonate away from molten PC having a high viscosity is inevitable to raise the polymerization degree, reaction at a high temperature of 280° to 310° C. and under a high vacuum of about 1 mmHg (1 Torr) for a long time is required, and moreover a particular equipment suited for high temperature and high vacuum, and a strong stirring equipment because of the high viscosity of the product are necessary.

Further, the transesterification method had various disadvantages. Since the reaction is effected at high temperature, branching or crosslinking is easily caused, and accordingly high quality polymer is hardly produced. Moreover, coloration is unavoidable because of the reaction at high temperature for a long period (see Mikio Matsukane et al., Plastic Material Series [5] "Polycarbonate Resin" by Nikkan Kogyo Shimbunsha, 1969, pp.62-67).

In order to overcome the above-mentioned problems, a method of increasing the reaction rate by raising the reaction temperature or by increasing an amount of the catalyst was developed (CHEMISTRY AND PHYSICS OF POLYCARBONATES, H.SCHNELL; John Willy & Sons, 1964).

In the above-mentioned method, however, the reaction rate was not high enough, and the increase in viscosity of the system at the end of the reaction could not be prevented. Consequently, heat deterioration and fall in quality of the polymer caused by residual catalyst were unfavorably brought about.

Furthermore, in order to improve color tone, heat resistance, and water resistance, various kinds of catalysts have been examined (see Japanese Patent Application Laid-Open No. 175723/1990), and improvements in processing have been attempted (see Japanese Patent Application Laid-Open Nos. 153923/1990 to 153927/1990), but PC having satisfactory quality cannot be obtained yet.

SUMMARY OF THE INVENTION

The present inventors have intensively studied to improve color tone, heat resistance and water resistance in PC, and to develop a process for efficiently producing PC with high quality.

As the result, it was found that the above-mentioned problems can be dissolved by using a specified amount of inert solvent in a process for producing PC by esterification. The present invention was accomplished based on the above findings.

The present invention provides a process for producing polycarbonate, which comprises transesterifying (A) at least one compound selected from the group consisting of aromatic dihydroxy compounds, aliphatic dihydroxy compounds, bisesters of aromatic dihydroxy compounds, bisesters of aliphatic dihydroxy compounds, carbonates of aromatic dihydroxy compounds, and carbonates of aliphatic dihydroxy compounds, and (B) at least one compound selected from the group of diaryl carbonates, dialkyl carbonates, and alkylaryl carbonates, in the temperature range of 100° C. to 330° C. in the presence of an inert solvent in an amount of 1 to 60% by weight based on the total of the theoretical amount of the polycarbonate produced from the said compounds (A) and (B) and the amount of the inert.

DESCRIPTION OF PREFERRED EMBODIMENTS

The aromatic dihydroxy compounds to be used in the present invention vary in kind. Example of said compounds are those represented by the formula (I):

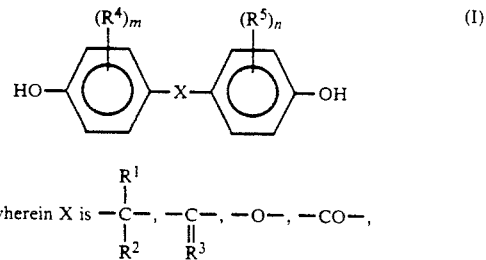

wherein X is $-\overset{R^1}{\underset{R^2}{\overset{|}{\underset{|}{C}}}}-$, $-\overset{\overset{\|}{C}}{\underset{R^3}{-}}-$, $-O-$, $-CO-$, $-S-$, $-SO-$ or $-SO_2-$, $R^1$ and $R^2$ are each a hydrogen atom or monovalent hydrocarbon group, $R^3$ is a divalent hydrocarbon group, $R^4$ and $R^5$ are each a hydrogen atom, a monovalent hydrocarbon group or a halogen atom, and m and n indicates an integer of 1 to 4.

Specific examples of these compounds are bis(hydroxyaryl)alkanes such as bis(4-hydroxyphenyl)methane, 1,1-bis(4-hydroxyphenyl)ethane, 2,2-bis(4-hydroxyphenyl)propane (common name: bisphenol A), 2,2-bis(4-hydroxyphenyl)butane, 2,2-bis(4-hydroxyphenyl)octane, 2,2-bis(4-hydroxyphenyl)phenyl methane, 2,2-bis(4-hydroxy-1-methylphenyl)propane, 1,1-bis(4-hydroxy-t-butylphenyl)propane, 2,2-bis(4-hydroxy-3-bromophenyl)propane, 2,2-bis(4-hydroxy-3,5-tetramethylphenyl)propane, 2,2-bis(4-hydroxy-3-chlorophenyl)propane, 2,2-bis(4-hydroxy-3,5-tetrachlorophenyl)propane, and 2,2-bis(4-hydroxy-3,5-tetrabromophenyl)propane; bis(hydroxyaryl)cycloalkanes such as 1,1-bis(4-hydroxyphenyl)cyclopentane, 1,1-bis(4-hydroxyphenyl)cyclohexane, and 1,1-bis(4-hydroxyphenyl)-3,5,5-trimethylcyclohexane; dihydroxyarylethers such as 4,4-dihydroxydiphenylether, and 4,4'-dihydroxy-3,3'-dimethylphenylether; dihydroxydiarylsulfides such as 4,4'-dihydroxydiphenylsulfide, and 4,4'-dihydroxy-3,3'-dimethyldiphenylsulfide; dihydroxyarylsulfoxides such as 4,4'-dihydroxydiphenylsulfoxide, and 4,4'-dihydroxy-3,3'-dimethyldiphenylsulfoxide; and dihydroxydiarylsulfones such as 4,4'-dihydroxydiphenylsulfone, and 4,4'-dihydroxy-3,3'-dimethyldiphenylsulfone.

Further, various aliphatic dihydroxy compounds can be used in the present invention. Specific examples of said compounds are butane-1,4-diol, 2,2-dimethylpropane-1,3-diol, hexane-1,6-diol, diethyleneglycol, triethyleneglycol, tetraethyleneglycol, octaethyleneglycol, dipropyleneglycol, N,N-methyldiethanolamine, cyclohexane-1,3-diol, cyclohexane-1,4-diol, 1,4-dimethylolcyclohexane, p-xylileneglycol, 2,2-bis-(4-hydroxycyclohexyl)-propane, and products of ethoxication or propoxication of dihydric alcohol or phenol, such as bis-oxyethyl-bisphenol A, bis-oxyethyltetrachlorobisphenol A and bis-oxyethyltetrachlorohydroquinone.

As the bisesters of aromatic dihydroxy compounds, bisesters of aliphatic dihydroxy compounds, carbonates of aromatic dihydroxy compounds, or carbonates of aliphatic dihydroxy compounds to be used in the present invention, bisesters ((II) or (IV)) or carbonates ((III) or (V)) of the above compounds are mentioned.

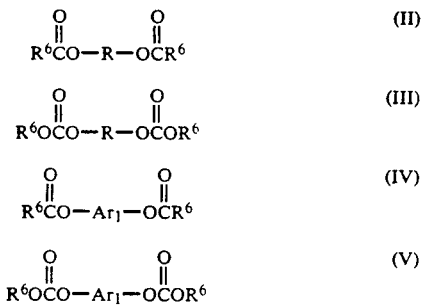

wherein R indicates the residue after two hydroxyl groups are removed from the above-mentioned aliphatic dihydroxy compound, $Ar_1$ indicates the residue after two hydroxyl groups are removed from the above-mentioned aromatic dihydroxy compounds, and $R^6$ indicates an alkyl group having 1 to 6 carbon atoms or a cycloalkyl group having 4 to 7 carbon atoms.

In the process of the present invention, above-mentioned compounds are selected properly and used as material (A).

Material (B) to be used in the present invention is a diaryl carbonate, a dialkyl carbonate, or an alkylaryl carbonate. Therein favorable diaryl carbonates, dialkyl carbonates, and alkylaryl carbonates are those represented by the formulae (VI), (VII), and (VIII), respectively:

$$Ar_2OCOAr_2 \quad \text{(VI)}$$
$$\underset{\|}{O}$$

$$R^6OCOR^6 \quad \text{(VII)}$$
$$\underset{\|}{O}$$

$$Ar_2OCOR^6 \quad \text{(VIII)}$$
$$\underset{\|}{O}$$

wherein $R^6$ is as defined above, and $Ar_2$ indicates an aryl group.

Specific example of these diaryl carbonates are diphenylcarbonate, ditollylcarbonate, bis(chlorophenyl)carbonate, m-cresylcarbonate, dinaphthylcarbonate, and bis(diphenyl)carbonate. Specific example of dialkyl carbonate are diethylcarbonate, dimethylcarbonate, dibutylcarbonate, and dicyclohexylcarbonate. Specific examples of alkylaryl carbonate compounds are methylphenyl carbonate, ethylphenyl carbonate, butylphenyl carbonate, and cyclohexylphenyl carbonate.

In the process of the present invention, above-mentioned compounds are selected properly and used as material (B). Of these compounds, diphenylcarbonate is particularly preferred as the starting material (B).

The process of the present invention employs above-mentioned materials (A) and (B), which must be reacted in an inert solvent.

The inert solvent to be used therein can be selected properly according to the circumstances. Specific examples are aromatic compounds such as diphenylether, halogenated diphenylether, diphenylsulfone, benzophenone, polyphenylether, dichlorobenzene, and methylnaphthalene; gases such as carbon dioxide, nitrogen, dinitrogen oxide and chlorofluorohydrocarbon; alkanes such as ethane, and propane; cycloalkanes such as cyclohexane, tricyclo(5,2,10)-decane, cyclooctane, and cyclododecane; alkenes such as ethene and propene; and sulfur hexafluoride. As the inert solvent to be used in the present invention, diphenylether is particularly favorable.

Furthermore, terminators shown below can be used, though they are not required in the present invention. Specific examples of such terminators are monohydric phenols such as o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, o-cyclohexylphenol, m-cyclohexylphenol, p-cyclohexylphenol, o-phenylphenol, m-phenylphenol, p-phenylphenol, o-n-nonylphenol, m-n-nonylhhenol, p-n-nonylphenol, o-cumylphenol, m-cumylphenol, p-cumylphenol, o-naphthylphenol, m-naphthylphenol, p-naphthylphenol, 2,6-di-t-butylphenol, 2,5-di-t-butylphenol, 2,4-di-t-butylphenol, 3,5-di-t-butylphenol, 2,5-dicumylphenol, 3,5-dicumylphenol,

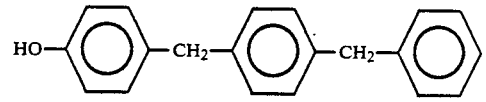

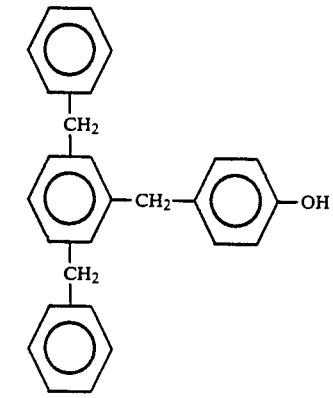

and chroman derivatives such as

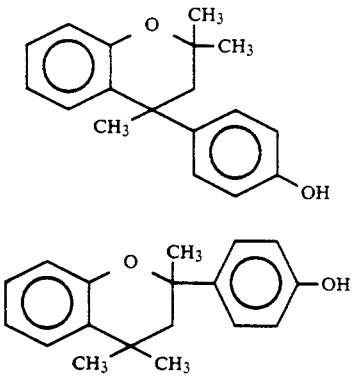

Of these phenols, p-t-butylphenol, p-cumylphenol, and p-phenylphenol are preferred, though they are not required in the present invention.

As another terminator, carbonic acid diesters are used in some cases. Specific examples of terminators of these carbonic acid diesters are carbobutoxyphenylphenylcarbonate, methylphenylbutylphenylcarbonate, ethylphenylbutylphenylcarbonate, dibutyldiphenylcarbonate, biphenylphenylcarbonate, dibiphenylcarbonate, cumylphenylphenylcarbonate, dicumylphenylcarbonate, naphthylphenylphenylcarbonate, dinaphthylphenylcarbonate, carbopropoxyphenylphenylcarbonate, carboheptoxyphenylphenylcarbonate, carbomethoxy-t-butylphenylphenylcarbonate, carboprotoxyphenylmethylphenylphenylcarbonate, cromanylphenylcarbonate, and dicromanylcarbonate.

If the amount of terminators such as monohydric phenols and carbonic acid diesters as above is in the range of 0.05 mol% to 10 mol% to 1 mol of dihydroxy compound as material (A), the ends of hydroxyl group of the resulting polycarbonate are sealed, and a polycarbonate which is sufficiently excellent in heat resistance and water resistance is obtained and the rate of polymerization and condensation becomes favorably higher.

These monohydric phenols or carbonic acid diesters may be added in the whole amount in advance to the reaction system, or they may be added partly in advance, and the residue may be added according as the reaction proceeds. Further, in some cases, they may be added to the reaction system at once, after the polycondensation reaction of dihydroxy compound of above-mentioned material (A) and the carbonate of material (B) partly proceeds.

The present invention requires no catalyst, but known catalysts may be used to promote the transesterification. Specific example of these catalysts are single substances, oxides, hydroxides, amides, alcoholates, and phenolates of alkali metals or alkaline earth metals; basic metal oxides such as ZnO, PbO, and $Sb_2O_3$, organic titanium compounds, soluble manganese compounds, acetates of Ca, Mg, Zn, Pb, Sn, Mn, Cd, and Co; combined catalysts such as nitrogen-containing basic compound and boron compound, nitrogen-containing basic compound and alkali (alkaline earth) metal compound, nitrogen-containing basic compound, alkali (alkaline earth) metal compound and boron compound.

The process of the present invention is to produce PC in the presence of an inert solvent. More specifically, the reaction proceeds according to the conventional transesterification method. The procedure and conditions of the process of the present invention are shown specifically as follows.

First, the amount of material (A), dihydroxy compounds such as aromatic dihydroxy compounds, aliphatic dihydroxy compounds, bisesters of aromatic dihydroxy compounds, carbonates of aromatic dihydroxy compounds, bisesters of aliphatic dihydroxy compounds, or carbonates of aliphatic dihydroxy compounds and the amount of material (B), carbonates such as diaryl carbonates, dialkyl carbonates or alkylaryl carbonates are adjusted so that the ratio of the amount of (B) to the amount of (A) is 1 to 1.5 times mol. According to the circumstances, the amount of the carbonates is preferred to be 1.02 to 1.20 times mol, which is somewhat in excess of the amount of dihydroxy compounds.

The reaction temperature is not critical, but usually it is in the range of 100° C. to 330° C., preferably 180° C. to 300° C. It is more preferred to gradually raise the temperature from 180° C. to 300° C. according as the reaction proceeds. Reactions proceed slowly under 100° C., while over 330° C. the resultant polymer is unfavorably deteriorated by heat.

The pressure at reaction can be set depending on the reaction temperature in accordance with the steam pressure of the monomer to be used. It is set so that the reaction goes efficiently, and not to be restricted. Usually at the initial stage of reaction, the pressure is set under 1 to 50 atm (760 to 38000 torr), and at the latter stage of reaction, the pressure is often reduced, favorably to be 0.01 to 100 torr finally. The reaction may be continued until the desired molecular weight is obtained, so the reaction time is usually 0.2 to 10 hours.

Above-mentioned reaction is conducted in the presence of an inert solvent in an amount of 1 to 60% by weight, favorably 5 to 40% by weight based on the total of the theoretical amount of PC produced from the before-mentioned materials (A) and (B), and the amount of the inert solvent, according as the reaction proceeds. The way of supplying the materials for said reaction is not limited particularly, and any step may be taken. Said inert solvent is used by the reasons (i) to (iii) as follows.

(i) Since it lowers the viscosity of the reactant, mixing can be effected in good conditions, and the reaction can proceed more speedily.

(ii) The side-product of the reaction can be easily removed, and the reaction can proceed more speedily.

(iii) Since the sublimation of diaryl carbonates can be prevented, the stoichiometry of the reaction can be kept, and higher-molecular polymer can be obtained.

Said inert solvent exhibits no effect when used in an amount under 1% by weight of the before-mentioned theoretical amount of resulting PC. When the amount of said solvent is in excess of 60% by weight, the viscosity of the reaction mixture is lowered, but there involved the problems in that the molecular weight of the resulting PC does not increase in a short time since monomers come more rarely in contact with each other, and that an enormous cost is required for recovering the solvent.

In the present invention, as the reaction proceeds, phenols, alcohols or esters thereof corresponding to the carbonates used as the starting material, and inert solvent are released from the reactor. These released materials can be separated and purified to be recycled, and equipments to remove them is desired, if possible.

The process of the present invention can be conducted batchwise or continuously, and any equipment can be used in this process. In a continuous production, it is preferred to use at least two reactors to set the reaction conditions as above.

The construction of the reactor to be used in the present invention is not critical, so long as it possesses an ordinary stirring function. However, as the viscosity is raised at the latter stage of the reaction, reactors are preferred to have a stirring function for high viscosity. Further, the shape of the reactor may be extruder type as well as tank type.

In the process of the present invention, antioxidants can be used, if necessary. Specifically, phosphoric antioxidant agents such as tris(nonylphenyl)phosphite, trisphenylphosphite, 2-ethylhexyldiphenylphosphite, trimethylphosphite, triethylphosphite, tricresylphosphite, and triarylphoshite can be used.

PC obtained in the above manner may be pelletized directly, or can be molded by the use of an extruder or the like.

PC obtained by the present invention can be used with conventional additives such as plasticizer, pigment, lubricant, mold-releasing agent, stabilizer, inorganic filler and the like.

Furthermore, said PC can be used in mixtures with polymers such as polyester, polysulfonate, polyamide, polyphenyleneoxide and the like.

As described above, according to the present invention, the use of a specified amount of inert solvent lowers the viscosity of the system, and shorten the reaction time, thus, a PC which is excellent in color tone (transparency), heat resistance, and water resistance can be efficiently produced.

Moreover, since the process of the transesterification is simple and easy, it is possible to produce PC at a low cost.

Accordingly, the present invention can be utilized effectively and widely as a process for producing a high quality PC advantageously on an industrial scale.

The present invention is described in greater detail with reference to the following examples, although it is not limited thereto.

EXAMPLE 1

In a 1.4 L (L=liter) nickel steel autoclave equipped with a stirrer, 228 g (1 mol) of bisphenol A, 257 g (1.2 mol) of diphenyl carbonate, and 157 g (0.93 mol, 38% by weight) of diphenylether were placed, and substitution with nitrogen were repeated five times. The resulting mixture was heated to 180° C. to melt bisphenol A and diphenyl carbonate. Subsequently, at the same time when the temperature was raised from 180° C. to 220° C., stirring was started and a trace amount of nitrogen was passed through, the phenol resulted began to be distilled away. Then the reaction system was kept at 220° C. for 4 hours.

Subsequently, the temperature was raised from 220° C. to 280° C. over one hour, and simultaneously degree of vacuum was raised to remove the residual diphenyl carbonate and diphenylether, and thus transesterification proceeded.

The reaction was conducted with stirring for one hour, while the pressure was kept finally at 0.5 torr, and a viscous transparent polycondensate, that is, PC remained lastly in the autoclave. The PC was dissolved in methylene chloride, and measured for viscosity average molecular weight to obtain the value of 22000. The resulting PC was pulverized, and put in an extruder at 220° to 270° C. to be pelletized. Said pellet was injection molded, and the resulting molding was tested for YI and hot water tension. The result is shown in Table 1.

EXAMPLES 2 TO 6 AND COMPARATIVE EXAMPLES 1 AND 2

The procedure of Example 1 was repeated except that kind of monomer, amount of diphenylether, and reaction time varied in each Example. The resulting PCs were pulverized, put in the extruder at 220° to 270° C. to be pelletized. The pellet was injection molded and tested for YI and hot water tension. The result is shown in Table 1.

EXAMPLE 7

The procedure of Example 1 was repeated except that 228 g (1 mol) of bisphenol A, 257 g (1.2 mol) of diphenyl carbonate and 28.2 g (0.17 mol, 10% by weight) of diphenyl ether, and 6.8 g (0.05 mol to the amount of bisphenol A) of p-cumylphenol as the terminator were placed. PC, that is, a viscous and transparent polycondensate which remained in the autoclave lastly was dissolved in methylene chloride, and measured for the viscosity average molecular weight, to obtain the value of 20500. The result of hot water tension test showed that a resin excellent in water resistance could be obtained. The resulting PC was pulverized to be pelletized at 220° to 270° C. by an extruder. The pellet was injection molded, and subjected to YI and hot water tension test. The result is shown in Table 1.

EXAMPLE 8

The procedure of Example 1 was repeated except that 228 g (1 mol) of bisphenol A, 257 g (1.2 mol) of diphenyl carbonate and 28.2 g (0.17 mol, 10% by weight) of diphenylether, and, as the catalysts, 0.018 g of boric acid, 0.18 g of 15% aqueous solution of tetramethylammoniumhydroxide, and 0.003 g of sodium hydrogencarbonate were placed.

PC, the viscous and transparent condensate which remained in the autoclave lastly was dissolved into methylene chloride, and measured for the viscosity average molecular weight to obtain a value of 24000. The resulting PC was pulverized to be pelletized at 220° to 270° C. by an extruder. The pellet was injection molded, and subjected to YI test and hot water tension test. The result was shown in Table 1.

COMPARATIVE EXAMPLE 3

The procedure of Example 8 was repeated except that diphenylether was not used. The resulting PC was pulverized to pelletized at 220° to 270° C. by an extruder. The pellet was injection molded, and subjected to YI test and hot water tension test. The result is shown in Table 1.

EXAMPLE 9

The procedure of Example 1 was repeated except that 228 g (1 mol) of bisphenol A, 257 g (1.2 mol) of diphenyl carbonate and 28.2 g (0.15 mol, 10% by weight) of benzophenone were placed. PC, the viscous and transparent condensate which remained in the autoclave lastly was dissolved into methylene chloride, and measured for the viscosity average molecular weight to obtain a value of 19000. The resulting PC was pulverized, and pelletized at 220° to 270° C. by an extruder. The pellet was injection molded, and subjected to YI test and the hot water tension test. The result is shown in Table 1.

EXAMPLE 10

The procedure of Example 1 was repeated except that 228 g (1 mol) of bisphenol A, 257 g (1.2 mol) of diphenyl carbonate, and 28.2 g (0.20 mol, 10% by weight) of 1-methylnaphthalene were placed. PC, the viscous and transparent polycondensate lastly remained in the autoclave was dissolved in methylene chloride, and measured for the viscosity average molecular weight, to obtain the value of 16300. The resulting PC was puverized, and pelletized at 220° to 270° C. by an extruduer. Said pellet was injection molded, and subjected to YI test and the hot water tension test. The result is shown in Table 1.

cous and transparent polycondensate lastly remained in the autoclave was dissolved in methylene chloride, and measured for the viscosity average molecular weight, to obtain the value of 17300. The resulting PC was pulverized, and pelletized at 220° to 270° C. by an extruder. The pellet was injection molded, and subjected to YI test and the hot water tension test. The result is shown in Table 1.

The physical properties test mentioned above are shown as follows.

YI was determined with the use of Color Meter SM-3 manufactured by SUGA TESTER Co. (in accordance with JIS K7103-77).

As the hot water tension test, a test piece was dipped in hot water of 80° C. for 16 hours, and then subjected to the tensile test (in accordance with JIS K7113-81) after 2 hours.

TABLE 1

| | Starting Material | | | | Reaction Condition | | Result | | | |
|---|---|---|---|---|---|---|---|---|---|---|
| | (A) | Amount | (B) | Amount | Amount of Diphenylether*1 | Temperature (°C.) | Time (h) | Molecular weight (Mv) | YI | Hot Water Tension (%) Before | After |
| Example 1 | Bisphenol A | 228 g (1.0 mol) | Diphenyl-carbonate | 257 g (1.2 mol) | 157 g (38% by weight) | 220 220 → 280 280 | 4 1 1 | 22000 | 2.0 | 103 | 96 |
| Example 2 | Bisphenol A | 228 g (1.0 mol) | Diphenyl-carbonate | 257 g (1.2 mol) | 28.2 g (10% by weight) | 220 220 → 280 280 | 3 1 1 | 20500 | 1.9 | 100 | 94 |
| Example 3 | Bisphenol A Diacetate | 312 g (1.0 mol) | Dimethyl-carbonate | 70 g (1.2 mol) | 28.2 g (10% by weight) | 220 220 → 280 280 | 4 1 1 | 21000 | 2.2 | 101 | 96 |
| Example 4 | Bisphenol A Di(methyl-carbonate) | 344 g (1.0 mol) | Dimethyl-carbonate | 70 g (1.2 mol) | 28.2 g (10% by weight) | 220 220 → 280 280 | 4 1 2 | 21200 | 2.3 | 101 | 95 |
| Example 5 | Di-(hydroxy-ethyl)benzene | 166 g (1.0 mol) | Diphenyl-carbonate | 257 g (1.2 mol) | 28.2 g (10% by weight) | 220 220 → 280 280 | 4 1 2 | 17500 | 2.5 | 96 | 88 |
| Example 6 | Bisphenol A | 228 g (1.0 mol) | Dimethyl carbonate | 81 g (1.4 mol) | 28.2 g (10% by weight) | 220 220 → 280 280 | 4 1 2 | 16000 | 3.0 | 90 | 71 |
| Comparative Example 1 | Bisphenol A | 228 g (1.0 mol) | Diphenyl carbonate | 257 g (1.2 mol) | 0 | 220 220 → 280 280 | 4 1 1 | 6000 | — | — | — |
| Comparative Example 2 | Bisphenol A | 228 g (1.0 mol) | Diphenyl carbonate | 257 g (1.2 mol) | 1015 g (80% by weight) | 220 220 → 280 280 | 4 1 2 | 7300 | — | — | — |
| Example 7*2 | Bisphenol A | 228 g (1.0 mol) | Diphenyl-carbonate | 257 g (1.2 mol) | 28.2 g (10% by weight) | 220 220 → 280 280 | 4 1 1 | 20500 | 2.5 | 105 | 101 |
| Example 8*3 | Bisphenol A | 228 g (1.0 mol) | Diphenyl-carbonate | 257 g (1.2 mol) | 28.2 g (10% by weight) | 220 220 → 280 280 | 3 1 1 | 24000 | 9.0 | 105 | 99 |
| Comparative Example 3*3 | Bisphenol A | 228 g (1.0 mol) | Diphenyl-carbonate | 257 g (1.2 mol) | 0 | 220 220 → 280 280 | 3 1 1 | 21500 | 20.2 | 99 | 65 |
| Example 9*4 | Bisphenol A | 228 g (1.0 mol) | Diphenyl-carbonate | 257 g (1.2 mol) | Benzophenone 28.2 g (10% by weight) | 220 220 → 260 300 | 4 2 2 | 19000 | 5.4 | — | — |
| Example 10*4 | Bisphenol A | 228 g (1.0 mol) | Diphenyl-carbonate | 257 g (1.2 mol) | 1-methylnaphtha-lene 28.2 g (10% by weight) | 220 220 → 240 240 | 4 1 2 | 16300 | 4.3 | — | — |
| Example 11*4 | Bisphenol A | 228 g (1.0 mol) | Diphenyl-carbonate | 257 g (1.2 mol) | Phenylsulfone 28.2 g (10% by weight) | 220 200 → 300 300 | 4 2 2 | 17300 | 8.7 | — | — |

*1Percent by weight of the inert solvent based on the total of the theoretical amount of PC produced and the amount of the inert solvent
*2In Example 7, 0.05 mol of p-cumylphenol was added as the terminator.
*3In Example 8 and Comparative Example 3, boric acid, 15% aqueous solution of tetramethylammoniumhydroxide, and sodium hydrocarbonate were added as the catalysts.
*4In Example 9, 10, and 11, different solvent were used.

EXAMPLE 11

The procedure of Example 1 was repeated except that 228 g (1 mol) of bisphenol A, 257 g (1.2 mol) of diphenyl carbonate, and 28.1 g (0.13 mol, 10% by weight) of diphenylsulfone were placed. PC, the vis-

What is claimed is:

1. A process for producing polycarbonates, which comprises transesterifying by reacting in a reaction mixture consisting essentially of (A) at least one compound selected from the group consisting of aromatic dihydroxy compounds, aliphatic dihydroxy compounds, bisesters of aromatic dihydroxy compounds, bisesters of aliphatic dihydroxy compounds, carbonates of aromatic dihydroxy compounds and carbonates of aliphatic dihydroxy compounds, with (B) at least one compound selected from the group consisting of diaryl carbonates, dialkyl carbonates and alkylaryl carbonates, at a transesterification temperature of 100° C. to 300° C., in the presence of (C) an inert solvent in an amount of 1 to 60% by weight based on the total of the theoretical amount of polycarbonate produced from said compounds (A) and (B) and the amount of the inert solvent, in the presence or absence of (D) a catalyst, in the presence or absence of (E) a terminator and in the presence or absence of (F) an antioxidant.

2. The process as defined in claim 1, wherein 1 to 1.5 mol of the compound (B) is transesterified with 1 mol of the compound (A).

3. The process as defined in claim 1, wherein the inert solvent is diphenylether.

4. The process as defined in claim 1, wherein said (A) is the aromatic dihydroxy compound represented by the formula:

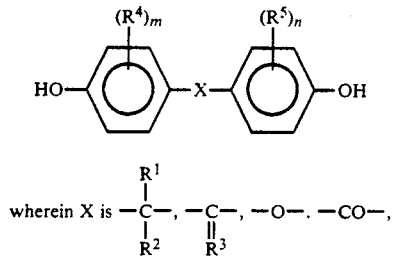

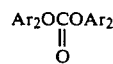

—S—, —SO— or —SO$_2$—, $R^1$ and $R^2$ are each a hydrogen atom or a monovalent hydrocarbon group, $R^3$ is a divalent hydrocarbon group, $R^4$ and $R^5$ are each a hydrogen atom, a monovalent hydrocarbon group or a halogen atom, and m and n are each an integer of 1 to 4.

5. The process as defined in claim 4, said (A) is the aromatic dihydroxy compound bisphenol A.

6. The process as defined in claim 1, wherein said (B) is the diaryl carbonate represented by the formula:

$$Ar_2OCOAr_2$$
$$\overset{\|}{O}$$

wherein $Ar_2$ is an aryl group.

7. The process as defined in claim 6, wherein the diaryl carbonate is diphenylcarbonate.

8. The process as defined in claim 1, wherein the transesterification temperature is 180° to 300° C.

9. The process as defined in claim 8, wherein the transesterification temperature is raised from 180° to 300° C. gradually as the transesterification proceeds.

10. The process as defined in claim 1, wherein the amount of the inert solvent is 5 to 40% by weight based on the total of the theoretical amount of the polycarbonate produced from compounds (A) and (B) and the amount of the inert solvent.

11. The process as defined in claim 1, wherein said (A) is selected from the group consisting of bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 2,2-bis(4-hydroxyphenyl)phenyl methane, 2,2-bis(4-hydroxy-1-methylphenyl)propane, 1,1-bis(4-hydroxy-t-butylphenyl)propane, 2,2-bis(4-hydroxy-3-bromophenyl)propane, 2,2-bis(4-hydroxy-3,5-tetramethylphenyl)propane, 2,2-bis(4-hydroxy-3-chlorophenyl)propane, 2,2-bis(4-hydroxy-3,5-tetrachlorophenyl)propane, 2,2-bis(4-hydroxy-3,5-tetrabromophenyl)propane, 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 4,4-dihydroxydiphenylether, 4,4'-dihydroxy-3,3'-dimethylphenylether, 4,4'-dihydroxydiphenylsulfide, 4,4'-dihydroxy-3,3'-dimethyldiphenylsulfide, 4,4'-dihydroxydiphenylsulfoxide, 4,4'-dihydroxy-3,3'-dimethyldiphenylsulfoxide, 4,4'-dihydroxydiphenylsulfone, 4,4'-dihydroxy-3,3'-dimethyldiphenylsulfone, butane-1,4-diol, 2,2-dimethylpropane-1,3-diol, hexane-1,6-diol, diethyleneglycol, triethyleneglycol, tetraethyleneglycol, octaethyleneglycol, dipropyleneglycol, N,N-methyldiethanolamine, cyclohexane-1,3-diol, cyclohexane-1,4-diol, 1,4-dimethylolcyclohexane, p-xylileneglycol, 2,2-bis-(4-hydroxycyclohexyl)-propane, bis-oxyethyl-bisphenol A, bis-oxyethyl-tetrachlorobisphenol and bis-oxyethyltetrachlorohydroquinone.

12. The process as defined in claim 1, wherein said (A) is selected from the group consisting of

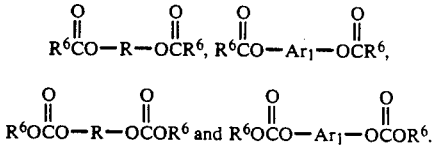

wherein R is an aliphatic group, $Ar_1$ is an aromatic group, and $R^6$ is an alkyl group having 1 to 6 carbon atoms or a cycloalkyl group having 4 to 7 carbon atoms.

13. The process as defined in claim 11, wherein said (B) is selected from the group consisting of diphenylcarbonate, ditollylcarbonate, bis(chlorophenyl)-carbonate, m-cresylcarbonate, dinaphthylcarbonate, bis(diphenyl)-carbonate, diethylcarbonate, dimethylcarbonate, dibutylcarbonate, dicyclohexylcarbonate, methylphenyl carbonate, ethylphenyl carbonate, butylphenol carbonate, and cyclohexylphenyl carbonate.

14. The process as defined in claim 13, wherein the inert solvent is selected from the group consisting of diphenylether, halogenated diphenylether, diphenylsulfone, benzophenone, polyphenylether, dichlorobenzene, methylnaphthalene, carbon dioxide, nitrogen, dinitrogen oxide, a chlorofluorohydrocarbon, ethane, propane, cyclohexane, tricyclo(5,2,10)-decane, cyclooctane, cyclododecane, ethene, propene and sulfur hexafluoride.

15. The process as defined in claim 14, wherein 1.02 to 1.20 moles of said (B) to 1 mole of said (A) are present.

16. The process as defined in claim 15, wherein said inert solvent is present in an amount of 5 to 40% by weight based on the total of the theoretical amount of the polycarbonate produced and the amount of said inert solvent; said inert solvent is diphenylether; said (A) is bisphenol A; and said (B) is diphenylcarbonate.

17. The process as defined in claim 1, wherein comprising reacting in the presence of a terminator selected from the group consisting of o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, o-cyclohexylphenol, m-cyclohexylphenol, p-cyclohexylphenol, o-phenylphenol, m-phenylphenol, p-phenylphenol, o-n-nonylphenol, m-n-nonxylphenol, p-n-nonylphenol, o-cumylphenol, m-cumylphenol, p-cumylphenol, o-naphthylphenol, m-naphthylphenol, p-naphthylphenol, 2,6-di-t-butylphenol, 2,5-di-t-butylphenol, 2,4-di-t-butylphenol, 3,5-di-t-butylphenol, 2,5-dicumylphenol, 3,5-dicumylphenol,

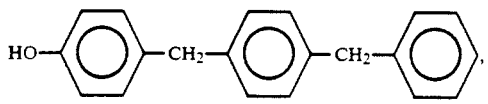

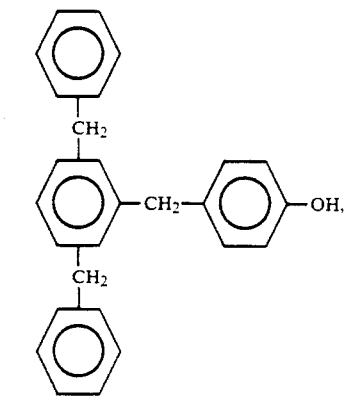

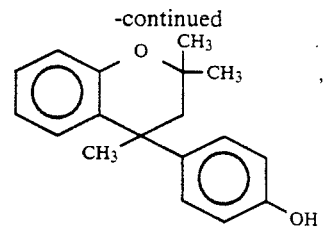

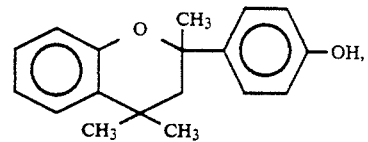

carbobutoxyphenylphenylcarbonate, methylphenylbutylphenylcarbonate, ethylphenylbutylphenylcarbonate, dibutyldiphenylcarbonate, biphenylphenylcarbonate, dibiphenylcarbonate, cumylphenylphenylcarbonate, dicumylphenylcarbonate, naphthylphenylphenylcarbonate, dinaphthylphenylcarbonate, carbopropoxyphenylphenylcarbonate, carboheptoxyphenylphenylcarbonate, carbomethoxy-t-butylphenylphenylcarbonate, carboprotoxyphenylmethylphenylphenylcarbonate, cromanylphenylcarbonate, and dicromanylcarbonate.

18. The process as defined in claim 1, wherein comprising reacting in the presence of a catalyst selected from the group consisting of oxides, hydroxides, amides, alcoholates and phenolates of alkali metals; oxides, hydroxides, amides, alcoholates and phenolates of alkaline earth metals; ZnO; PbO; $Sb_2O_3$; and acetates of Ca, Mg, Zn, Pb, Sn, Mn, Cd and Co.

19. The process as defined in claim 1, wherein comprising reacting in the presence of an antioxidant selected from the group consisting of tris(nonylphenyl)phosphite, trisphenylphosphite, 2-ethylhexyldiphenylphosphite, trimethylphosphite, triethylphosphite, tricresylphosphite and triarylphosphite.

* * * * *